T. C. BLACK.
GIN SAW GUMMING MACHINE.
APPLICATION FILED APR. 23, 1917.
1,293,007.
Patented Feb. 4, 1919.
2 SHEETS—SHEET 2.
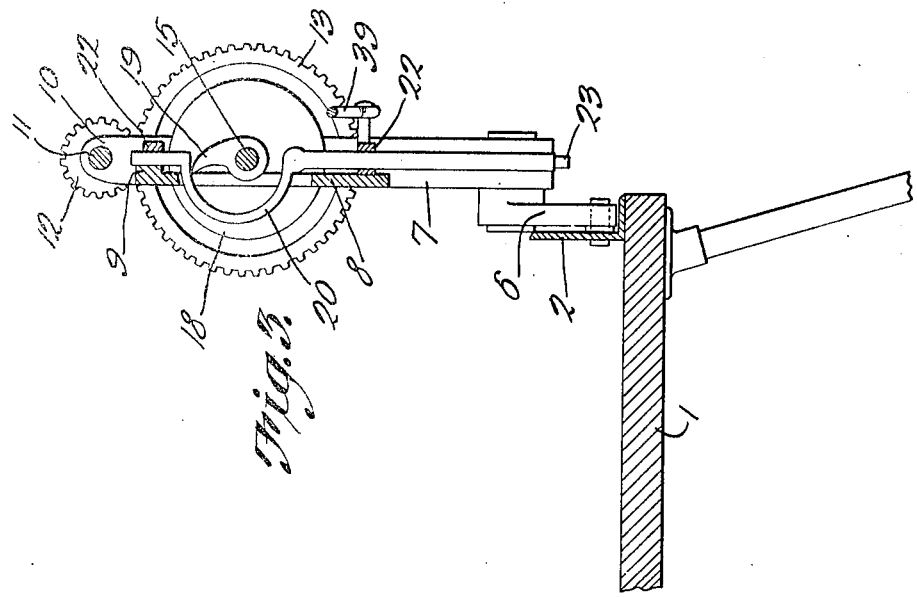
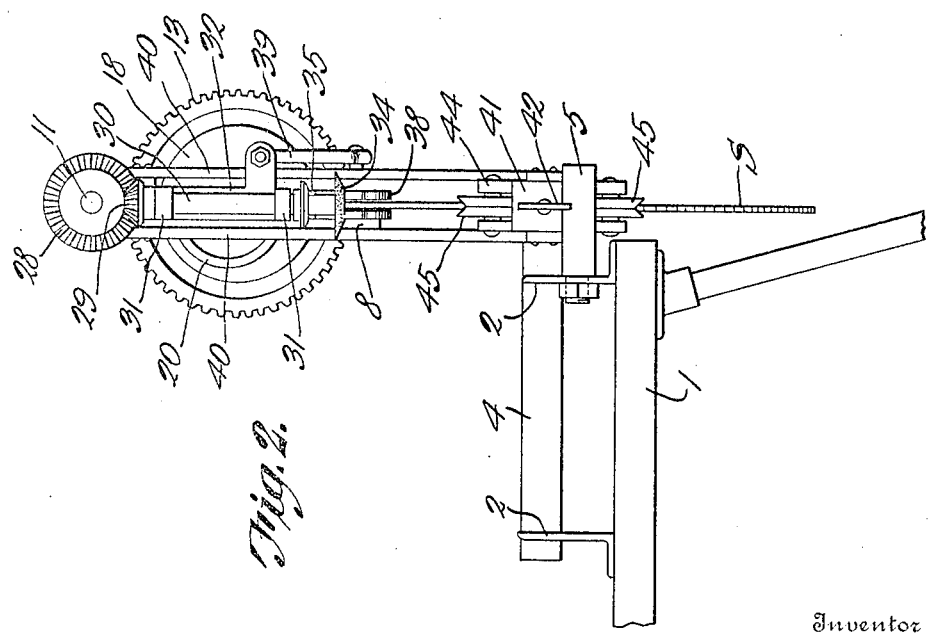
Inventor
T. C. Black
By C. A. Snow & Co.
Attorney
Witness

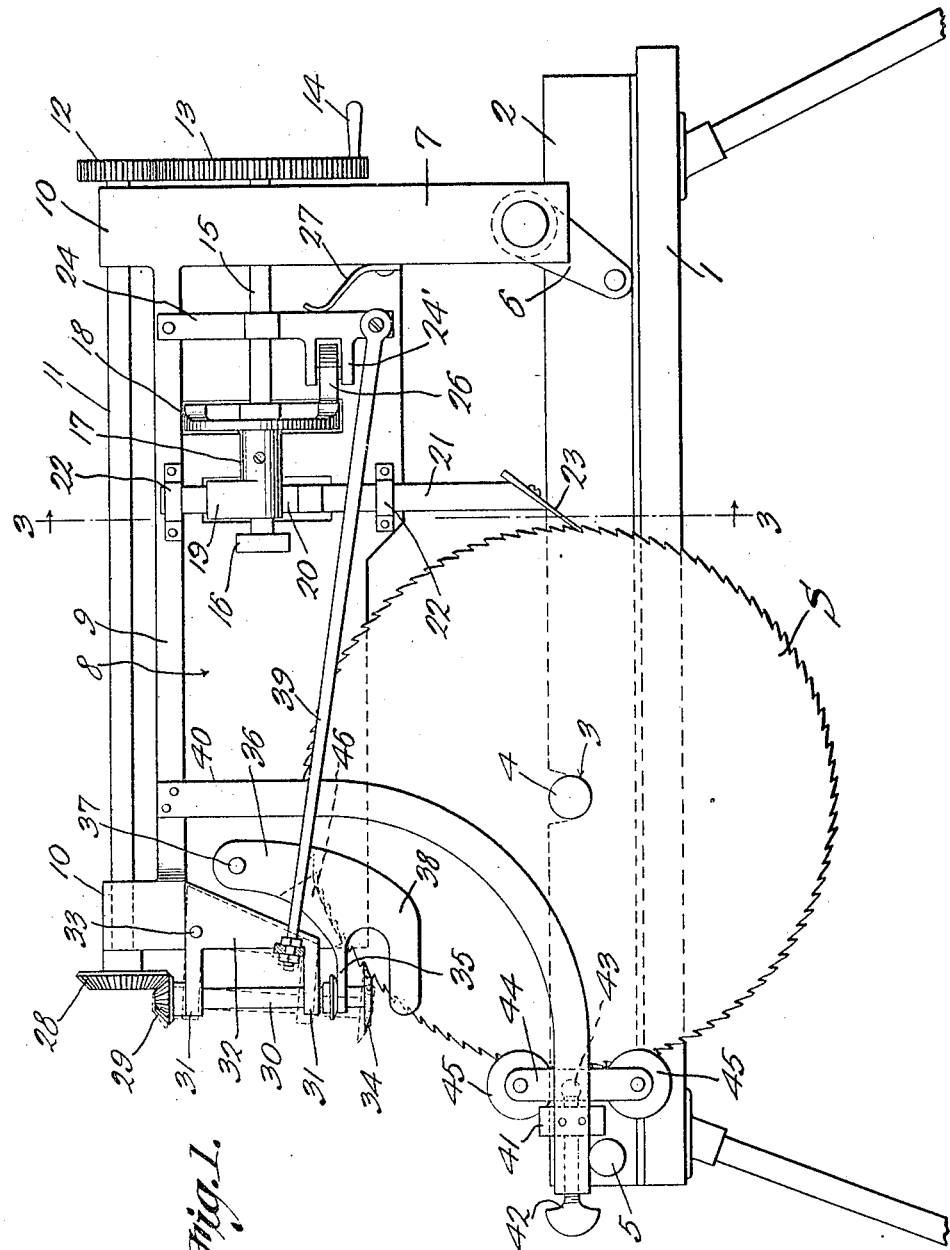

UNITED STATES PATENT OFFICE.

THOMAS C. BLACK, OF GREENWOOD, MISSISSIPPI.

GIN-SAW-GUMMING MACHINE.

1,293,007. Specification of Letters Patent. Patented Feb. 4, 1919.

Application filed April 23, 1917. Serial No. 163,993.

*To all whom it may concern:*

Be it known that I, THOMAS C. BLACK, a citizen of the United States, residing at Greenwood, in the county of Leflore and State of Mississippi, have invented a new and useful Gin-Saw-Gumming Machine, of which the following is a specification.

This invention relates to machines for filing the teeth of gin saws, one of the objects of the invention being to provide a machine of this character which will automatically impart a step-by-step rotation to the engaged saw and automatically feed a filing disk into the notches between the teeth while said disk is rotating, the various operations of the apparatus taking place in timed relation and being automatically adjustable to the saw so that no expert attention is required in using the machine in connection with a gin saw.

A further object is to provide a machine of this character which is simple, compact and efficient and can be actuated readily.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a side elevation of the machine, a gin saw being shown in position therein.

Fig. 2 is a front elevation of one side portion of the machine.

Fig. 3 is a section on line 3—3 Fig. 1.

Referring to the figures by characters of reference 1 designates a suitably supported table on which are secured parallel angle beams 2 notched, as at 3 to receive a shaft 4 on which the gin saw S is adapted to be placed. Extending laterally from one of the beams 2 near the front end thereof is a stud 5 and pivotally connected to the same beam close to the other end thereof is a link 6. Mounted on this link is one end of a frame 7 having a web 8 adjacent the top of which is provided a reinforcing rib 9 on which are mounted bearings 10. In these bearings is journaled a shaft 11 provided at one end with a gear 12 adapted to receive motion from a larger gear 13 which can be rotated in any suitable manner, as by means of a hand grasping a grip 14. Gear 13 is secured to a shaft 15 journaled in the end of the frame 7 and also in a bearing 16 on the web 8. Secured to this shaft 15 is a sleeve 17 provided at one end with a cam wheel 18, while extending from the other end of said sleeve is a cam 19 in the form of a curved tongue. The cam 19 is adapted to work within a substantially semicircular yoke 20 formed by offsetting laterally an intermediate portion of a slide bar 21. This bar is mounted in guides 22 arranged one above the other and connected to the lower end of the bar is a pawl 23 preferably in the form of a small spring blade or the like.

A lever 24 is pivotally connected to the rib 9 and is adapted to swing relative to and to extend below the shaft 15. This lever has a bracket 24' in which is journaled a roller 26 and said roller is held pressed constantly against the cam 18 by a spring 27.

A gear 28 is secured to shaft 11 at that end remote from the gear 12 and loosely meshes with another gear 29 secured to the upper end of a shaft 30. This shaft is journaled in bearings 31 extending from an arm 32 which is pivotally connected to the frame as indicated at 33 and extends downwardly. To the lower end of shaft 30 is connected a filing disk 34 and this shaft is straddled, near its lower end, by a fork 35 extending from a plate 36. Said plate is pivotally connected to the frame as indicated at 37 and is provided, at its lower end, with spaced wings 38 adapted to extend to opposite sides of the saw S. A rod 39 connects the pivoted arm 32 to the lower end of lever 24. Supporting strips 40 are fixedly connected to the frame and extend downwardly across opposite faces of the engaged saw and forwardly so as to rest on the stud 5. These strips or arms are connected at their front ends by a block 41 through which extends an adjusting screw 42. Said screw is swiveled as at 43 in a head 44 which carries spaced grooved wheels 45 adapted to engage and straddle the periphery of the saw S.

A gage block 46 is secured between the wings 38 and is so shaped as to rest on several teeth of the saw S, thus to limit the movement of the disk 34 into engagement with the teeth acted on.

In using the apparatus, the frame is swung upwardly and backwardly bodily and after the saw has been placed in position, the frame is lowered so that the parts will assume the relative positions shown in Fig. 1. Gear 13 is rotated and motion is transmitted through gear 12 and the gears 28 and 29 to the disk 34. During the rotation of gear 13, shaft 15 will cause the two cams 18 and 19 to rotate in timed relation so that while cam 18 is in one position relative to the roller 26 and the spring 27 has thrust against lever 24 so as to push the arm 32 forwardly and disengage disk 34 from the saw teeth, the cam 19 successively thrusts downwardly on the bar 21 thus to rotate the saw one tooth and then moves upwardly within the yoke 20 to elevate the bar where it will be held by frictional engagement with its guides. As soon as the bar 17 has been elevated, the roller 26 moves onto the thick portion of the cam 18 and thus pulls through lever 24 and rod 39 upon the arm 32 and causes the disk 34 to swing into a notch between two teeth where the rotating disk will cut out the material of the saw and restore the teeth to their proper length. The inward swinging movement of the disk is limited by the shaft 30 engaging the inner portion of the fork 35 and the block 46 engaging the teeth of the saw. This block not only serves thus to limit the depth of the cut but also clamps on the saw and holds it steady. The wheels 45 also serve to hold the saw steady during the operation of the apparatus. As the frame is pivotally mounted in the manner described, it will adjust itself automatically to saw disks of different diameters or to disks of variable diameters.

What is claimed is:—

1. A saw gumming machine including a structure mounted for up and down swinging movement, a bearing member pivotally connected thereto, a shaft journaled in said member, a filing disk revoluble with the shaft, means for rotating the shaft, spaced wings pivotally connected to said structure for receiving a saw therebetween, a gage block connected to the wings for resting on the teeth of said saw, a connection between the shaft and wings for swinging the gage block into and out of engagement with the saw, means for swinging the shaft intermittently, and means for supporting a saw between the wings and in the path of the disk.

2. A saw gumming machine including a structure mounted for up and down swinging movement, a shaft mounted to swing relative thereto, means for rotating the shaft, a filing disk revoluble with the shaft, strips extending from said structure, adjustably mounted grooved wheels carried by the strips, means for supporting a saw with its periphery in engagement with said wheels, means for intermittently swinging the shaft to move the disk into and out of engagement with the saw, and means operated in timed relation with the disk for rotating the saw one tooth while the disk is out of engagement with the saw.

3. A saw gumming machine including saw supporting means, a revoluble shaft mounted for swinging movement, a filing disk movable with the shaft, grooved rollers, means for adjusting the rollers against the periphery of the saw, a drive shaft, separate cams thereon, means operated by one of the cams for intermittently swinging the shaft of the filing disk, and means operated by the other cam for rotating the saw one tooth while the disk is out of engagament with the saw.

4. The combination with saw supporting means, of a structure adapted to swing down into position over and adjacent the saw, a revoluble shaft mounted to swing relative to said structure, a filing disk movable with said shaft, a gage adapted to swing with the shaft to limit its movement toward the saw, adjustably mounted revoluble means movable with said structure and below the disk for engaging the periphery of the saw, a drive shaft, separate cams revoluble therewith, means operated by one of the cams for swinging the disk into and out of engagement with the saw, and means operated by the other cam for rotating the saw one tooth when the disk is disengaged therefrom.

In testimony that I claim the foregoing as my own, I have hereto affixed my signature in the presence of two witnesses.

THOMAS C. BLACK.

Witnesses:
R. V. POLLARD,
W. M. HAMNER.

Copies of this patent may be obtained for five cents each, by addressing the "Commissioner of Patents, Washington, D. C."